(12) United States Patent
Ellena et al.

(10) Patent No.: US 12,576,492 B2
(45) Date of Patent: Mar. 17, 2026

(54) POWER TOOL INCLUDING CLOSED LOOP SPEED CONTROL

(71) Applicant: MILWAUKEE ELECTRIC TOOL CORPORATION, Brookfield, WI (US)

(72) Inventors: Mitchell A. Ellena, West Allis, WI (US); Jonathon R. Gasteiner, Brookfield, WI (US); Noah P. Seiler, Milwaukee, WI (US); Ryan A. Khatib, Waukesha, WI (US); Lokeshwaran Rajendran, West Allis, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 25 days.

(21) Appl. No.: 18/760,202

(22) Filed: Jul. 1, 2024

(65) Prior Publication Data

US 2025/0065482 A1 Feb. 27, 2025

Related U.S. Application Data

(60) Provisional application No. 63/520,700, filed on Aug. 21, 2023.

(51) Int. Cl.
| | |
|---|---|
| *B25C 1/04* | (2006.01) |
| *B25C 1/06* | (2006.01) |
| *H02P 3/02* | (2006.01) |

(52) U.S. Cl.
CPC ................ *B25C 1/047* (2013.01); *H02P 3/02* (2013.01); *B25C 1/06* (2013.01)

(58) Field of Classification Search
None
See application file for complete search history.

(56) References Cited

U.S. PATENT DOCUMENTS 8,763,874 B2 * 7/2014 McCardle ................. B25C 1/06
227/129
11,498,194 B2 11/2022 Wechselberger et al.
(Continued)

FOREIGN PATENT DOCUMENTS

| DE | 102024102300 A1 | 8/2024 |
|---|---|---|
| DE | 102024112566 A1 | 11/2024 |
| EP | 4393649 A1 | 7/2024 |

OTHER PUBLICATIONS

German Patent Office Action for Application No. 102024118555.4 dated May 5, 2025 (6 pages including English translation).

*Primary Examiner* — Veronica Martin
(74) *Attorney, Agent, or Firm* — Michael Best & Friedrich LLP

(57) ABSTRACT

A power tool including a housing, a motor at least partially positioned within the housing, a driver blade extending along a driving axis, and a cam assembly including a cam that is configured to rotate about a rotational axis to move the driver blade. The cam includes a target that rotates with the cam. A sensor is configured to detect the target when the target is at a predetermined rotational position of the cam. A controller is connected to the motor and the sensor. The controller is configured to receive a signal from the sensor indicating that the target is at the predetermined rotational position of the cam, compare a motor parameter to a threshold value, and initiate a speed ramp down in response to the target being at the predetermined rotational position of the cam and the motor parameter being greater than or equal to the threshold value.

20 Claims, 12 Drawing Sheets

(56) References Cited

U.S. PATENT DOCUMENTS

| 12,017,335 | B2 | 6/2024 | Mashiko et al. |
| 12,109,672 | B2 | 10/2024 | Aizawa et al. |
| 2021/0237242 | A1 | 8/2021 | Carrier |
| 2022/0001525 | A1* | 1/2022 | Panetta .................... B25F 5/00 |

* cited by examiner

Figure 10:
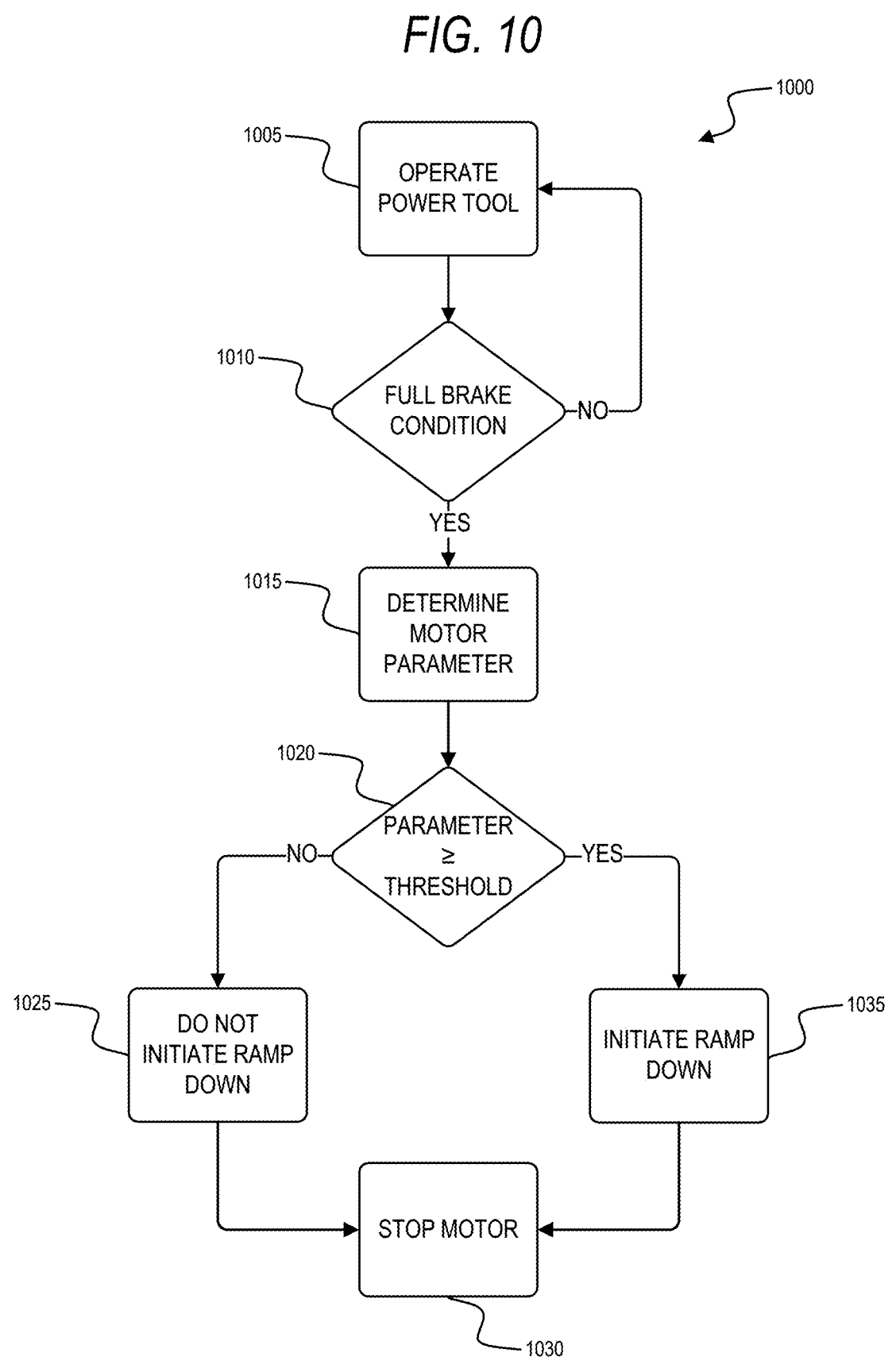

1005 — OPERATE POWER TOOL

1010 — FULL BRAKE CONDITION

NO

YES

1015 — DETERMINE MOTOR PARAMETER

1020 — PARAMETER ≥ THRESHOLD

NO

YES

1025 — DO NOT INITIATE RAMP DOWN

1035 — INITIATE RAMP DOWN

STOP MOTOR

1030

POWER TOOL INCLUDING CLOSED LOOP SPEED CONTROL

RELATED APPLICATIONS

This application claims the benefit of U.S. Provisional Patent Application No. 63/520,700, filed Aug. 21, 2023, the entire content of which is hereby incorporated by reference.

FIELD

Embodiments described herein relate to power tools.

SUMMARY

Embodiments described herein relate to power tools, such as a fastener driver that implements closed loop speed control. The closed loop speed control is used to control a speed at which a motor rotates during, for example, a reload cycle of the fastener driver.

Power tools described herein include a housing including a drive unit support portion, a cylinder support portion, and a handle portion, a motor at least partially positioned within the drive unit support portion, a storage chamber cylinder at least partially positioned within the cylinder support portion, an inner cylinder having an annular inner wall defining a driving axis, at least a portion of the annular inner wall located within the storage chamber cylinder, a driver blade extending along the driving axis, and a cam assembly including a cam that is configured to rotate about a rotational axis to move the driver blade. The cam includes a target that rotates with the cam. A sensor is configured to detect the target when the target is at a predetermined rotational position of the cam. A controller is connected to the motor and the sensor. The controller is configured to receive a signal from the sensor indicating that the target is at the predetermined rotational position of the cam, compare a motor parameter to a threshold value, and initiate a speed ramp down in response to the target being at the predetermined rotational position of the cam and the motor parameter being greater than or equal to the threshold value.

In some aspects, the controller is configured to not initiate the speed ramp down in response to the target being at the predetermined rotational position of the cam and the motor parameter being less than the threshold value.

In some aspects, the target includes a magnet.

In some aspects, the sensor is a Hall effect sensor that is configured to detect a position of the magnet.

In some aspects, the Hall effect sensor is configured to detect the position of the magnet when the magnet is at the predetermined rotational position of the cam.

In some aspects, the speed ramp down is a linear speed ramp down.

In some aspects, the sensor includes an inductive sensor.

In some aspects, the inductive sensor is configured to detect the position of the target when the target is at the predetermined rotational position of the cam.

In some aspects, the speed ramp down is a linear speed ramp down.

In some aspects, the motor parameter is a speed of the motor and the threshold value is a speed threshold value of the motor.

Methods described herein relate to a method of operating a power tool. The power tool includes a driver blade extending along a driving axis and a cam assembly including a cam that is configured to rotate about a rotational axis to move the driver blade. The cam includes a target that rotates with the cam. The method includes receiving, at a controller of the power tool, a signal from a sensor indicating that the target is at a predetermined rotational position of the cam, comparing a motor parameter to a threshold value, and initiating a speed ramp down in response to the target being at the predetermined rotational position of the cam and the motor parameter being greater than or equal to the threshold value.

In some aspects, the target includes a magnet.

In some aspects, the sensor is a Hall effect sensor, and the method further includes detecting, with the Hall effect sensor, a position of the magnet.

In some aspects, the method further includes detecting, with the Hall effect sensor, the position of the magnet when the magnet is at the predetermined rotational position of the cam.

In some aspects, the speed ramp down is a linear speed ramp down.

In some aspects, the sensor includes an inductive sensor.

In some aspects, the method further includes detecting, using the inductive sensor, the target when the target is at the predetermined rotational position of the cam.

In some aspects, the speed ramp down is a linear speed ramp down.

In some aspects, the motor parameter is a speed of the motor and the threshold value is a speed threshold value of the motor.

Power tools described herein include a housing, a motor at least partially positioned within the housing, a driver blade extending along a driving axis, and a cam assembly including a cam that is configured to rotate about a rotational axis to move the driver blade. The cam includes a target that rotates with the cam. A sensor is configured to detect the target when the target is at a predetermined rotational position of the cam. A controller is connected to the motor and the sensor. The controller is configured to receive a signal from the sensor indicating that the target is at the predetermined rotational position of the cam, compare a motor parameter to a threshold value, and initiate a speed ramp down in response to the target being at the predetermined rotational position of the cam and the motor parameter being greater than or equal to the threshold value.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

BRIEF DESCRIPTION OF THE DRAWINGS

FIG. 10 is a process for controlling the power tool of FIG. 1A.

DETAILED DESCRIPTION

Figure 1A:
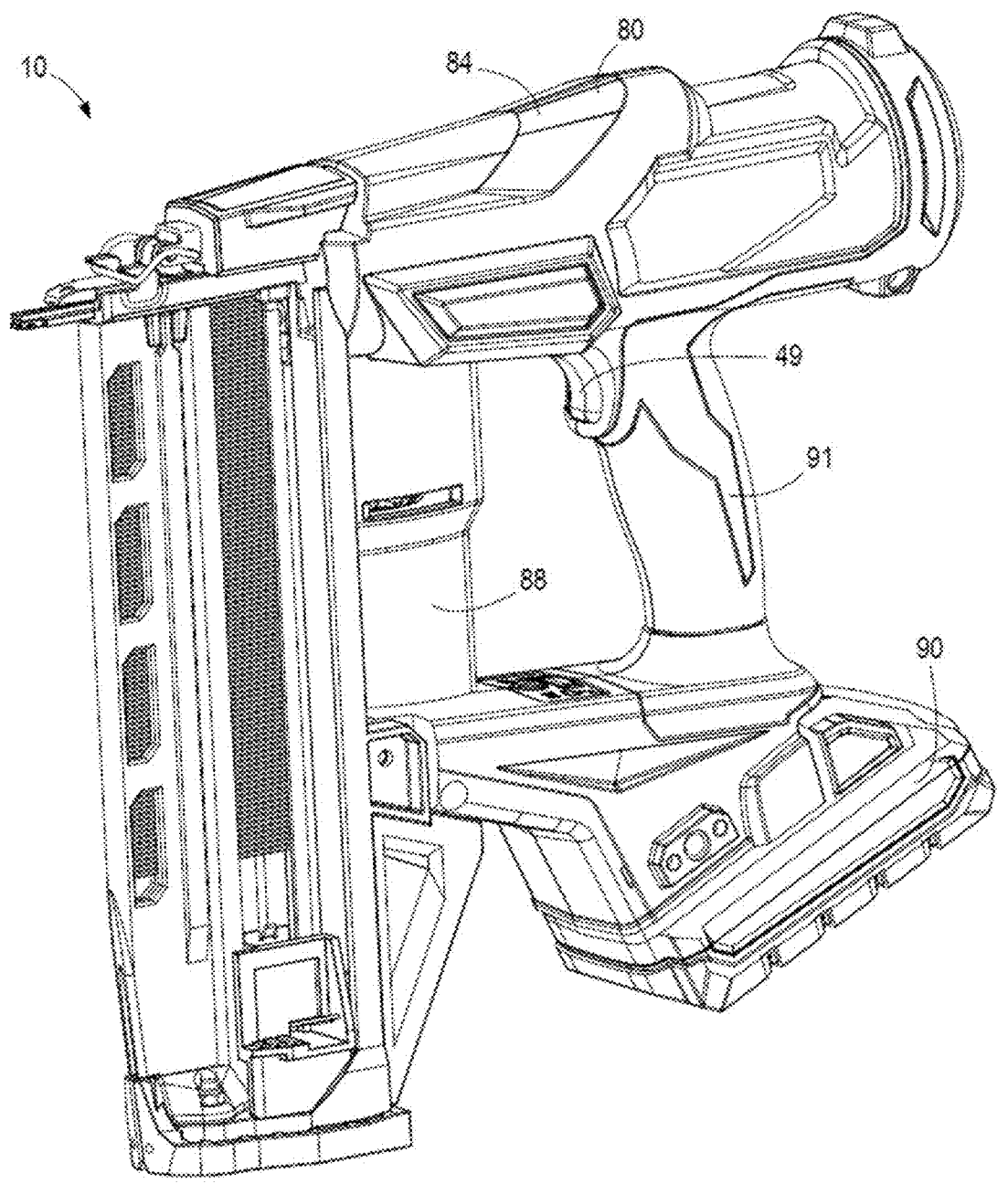
FIG. 1A is perspective view of a power tool in accordance with an embodiment of the invention.
Figure 1B:
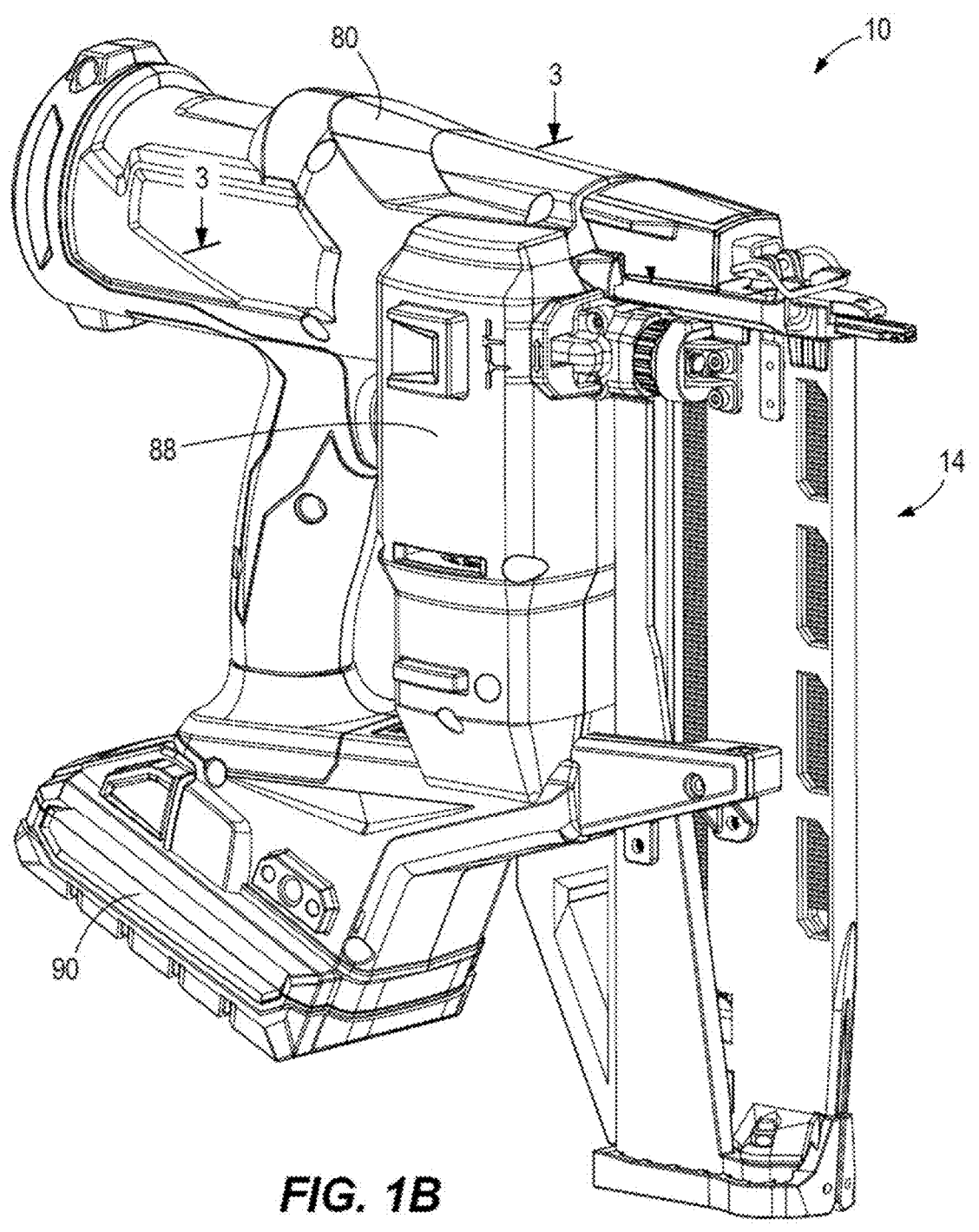
FIG. 1B is another perspective view of the power tool of FIG. 1A further illustrating a depth of drive adjustment assembly.
Figure 3:
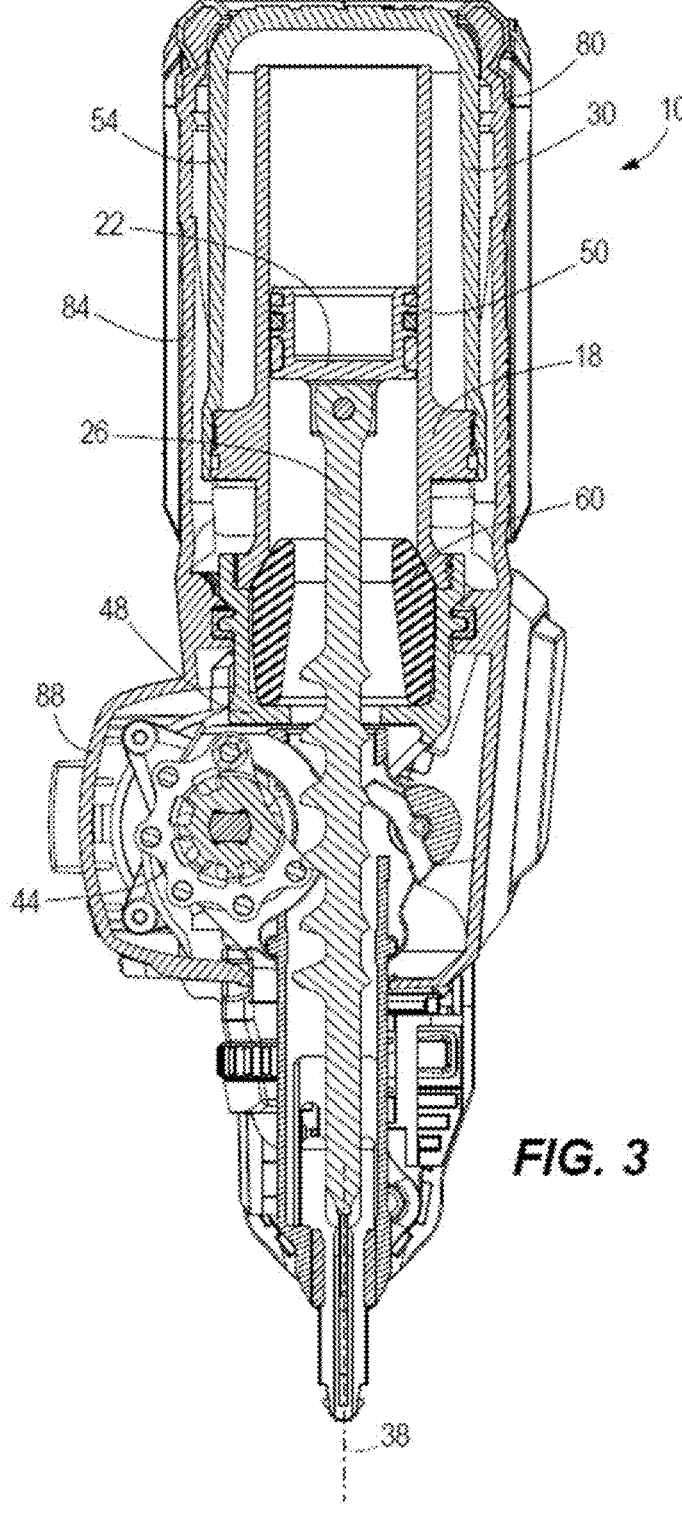
FIG. 3 is a cross-sectional view of the power tool of FIG. 1A taken along the line 3-3 of FIG. 1B.
Figure 4:
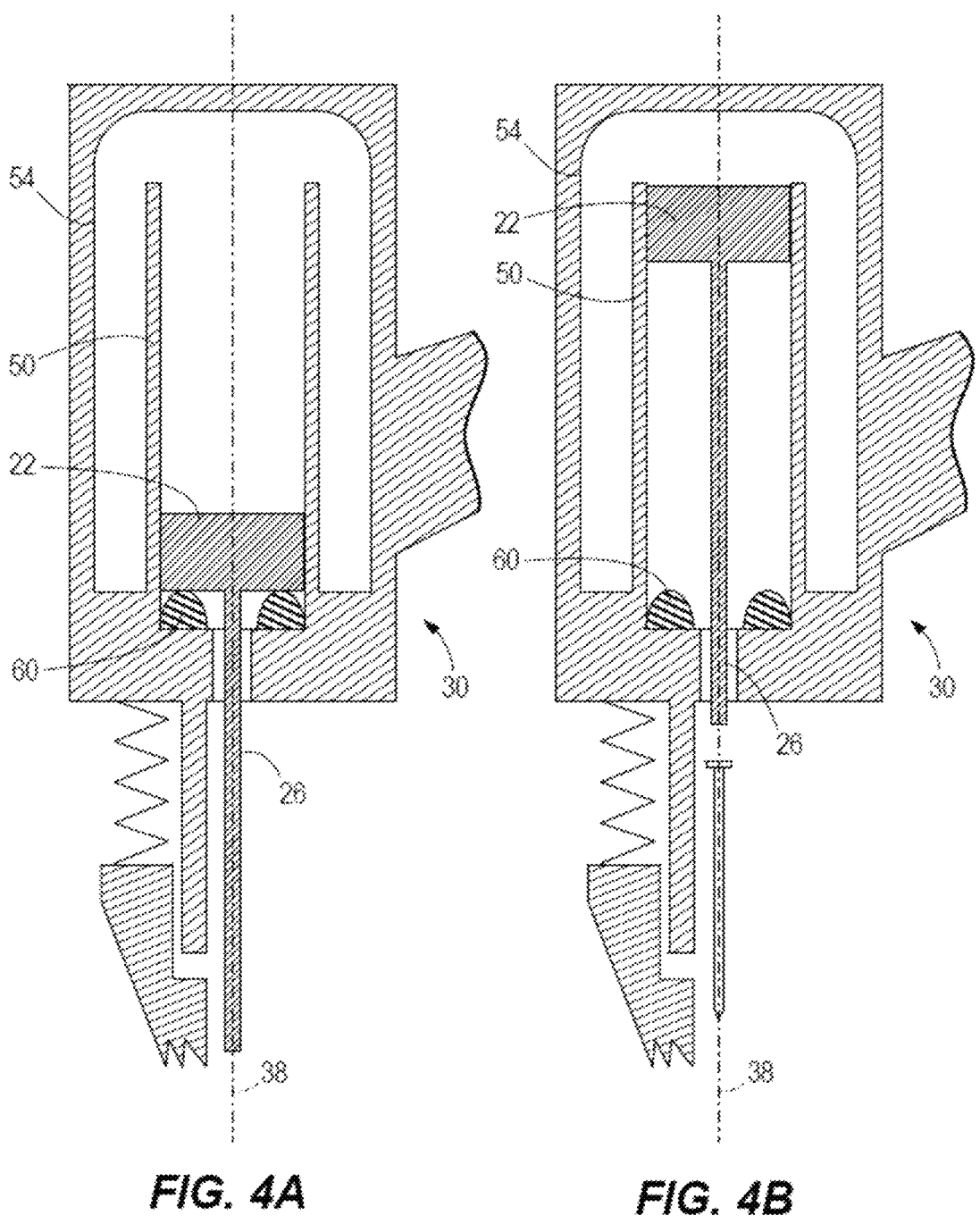
FIG. 4A is a schematic view of the power tool of FIG. 1A, illustrating a driver blade in a driven or bottom-dead-center position.
FIG. 4B is a schematic view of the power tool of FIG. 1A, illustrating a driver blade in a top-dead-center position.

With reference to FIGS. 1A and 1B, a power tool 10, such as a gas spring-powered fastener driver, is operable to drive fasteners (e.g., nails, tacks, staples, etc.) held within a magazine 14 into a workpiece. The power tool 10 includes an inner cylinder 18 and a moveable piston 22 positioned within the inner cylinder 18 (FIGS. 3-4B). With reference to FIG. 3-4B, the power tool 10 further includes a driver blade 26 that is attached to the piston 22 and moveable therewith. The power tool 10 does not require an external source of air pressure, but rather includes an outer storage chamber cylinder 30 of pressurized gas in fluid communication with the inner cylinder 18. In the illustrated embodiment, the inner cylinder 18 and moveable piston 22 are positioned within the storage chamber cylinder 30. The power tool 10 further includes a fill valve (not shown) coupled to the storage chamber cylinder 30. When connected with a source of compressed gas, the fill valve permits the storage chamber cylinder 30 to be refilled with compressed gas if any prior leakage has occurred. The fill valve may be configured as a Schrader valve, for example.

Figure 2:
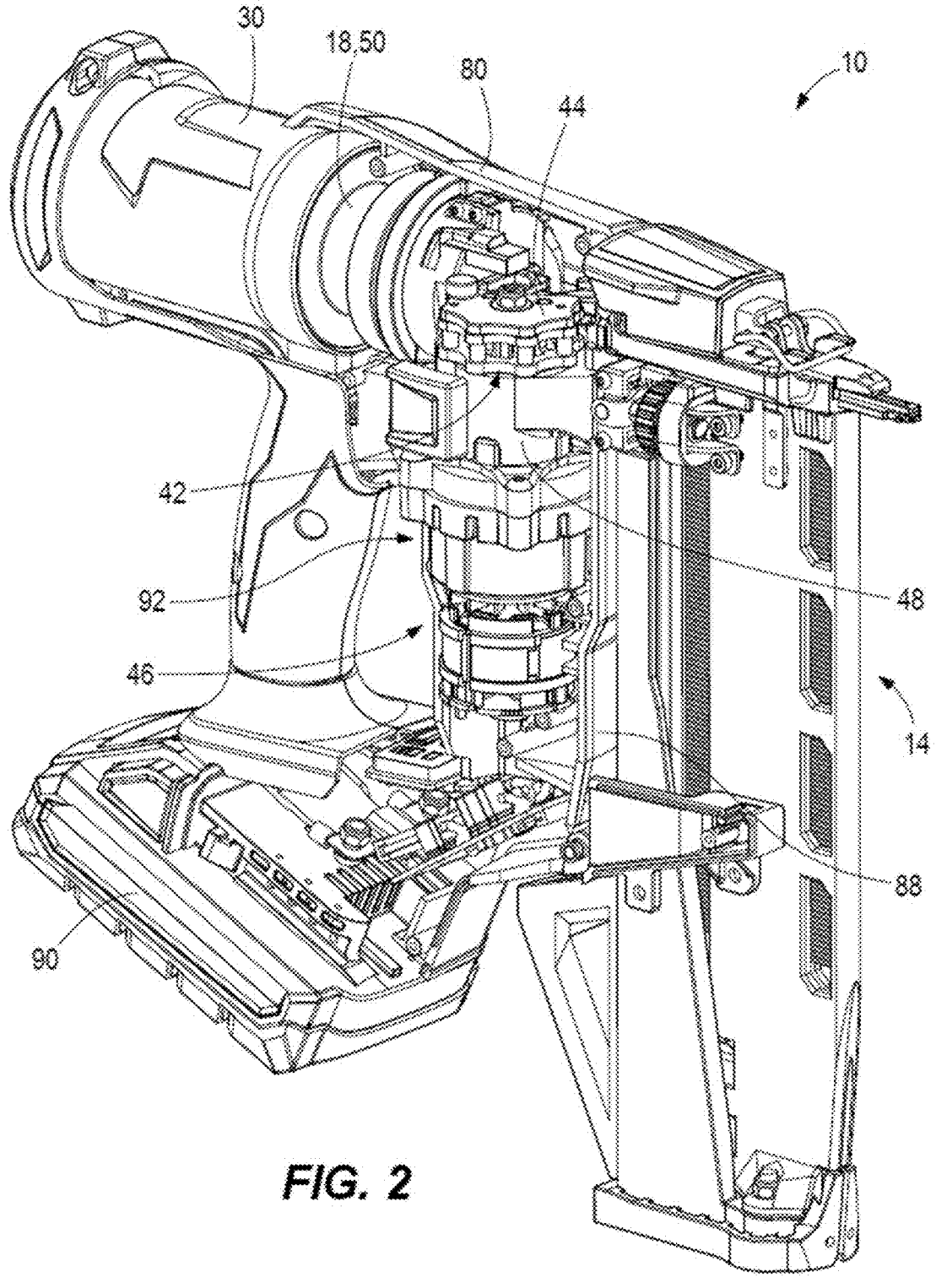
FIG. 2 is another perspective view of the power tool of FIG. 1A with a portion removed.

With reference to FIGS. 4A-4B, the inner cylinder 18 and the driver blade 26 define a driving axis 38. During a driving cycle, the driver blade 26 and piston 22 are moveable between a top-dead-center (TDC) position (FIG. 4B) and a driven or bottom-dead-center (BDC) position (FIG. 4A). With respect to FIGS. 2 and 3, the power tool 10 further includes a lifting assembly 42 (FIG. 2), which has a lifter 44 that is powered by a motor 46 (FIG. 2) and that moves the driver blade 26 from the driven position to the TDC position. As shown in FIGS. 2 and 3, in the illustrated embodiment, the inner cylinder 18 is defined in part by an inner frame 48 (e.g., inner housing). Specifically, the inner frame 48 is coupled to the inner cylinder 18. Further with respect to FIGS. 2 and 3, the inner frame 48 also supports, at least in part, the lifting assembly 42 and the motor 46. The inner frame 48 is constructed from a material that is more robust than plastic, such as metal.

In operation, the lifting assembly 42 drives the piston 22 and the driver blade 26 toward the TDC position by energizing the motor 46. As the piston 22 and the driver blade 26 are driven toward the TDC position, the gas above the piston 22 and the gas within the storage chamber cylinder 30 is compressed. Prior to reaching the TDC position, the motor 46 is deactivated and the piston 22 and the driver blade 26 are held in a ready position, which is located between the TDC and the BDC or driven positions, until being released by user activation of a trigger 49 (FIG. 1A). When released, the compressed gas above the piston 22 and within the storage chamber cylinder 30 drives the piston 22 and the driver blade 26 to the driven position, thereby driving a fastener into the workpiece. The illustrated power tool 10 therefore operates on a gas spring principle utilizing the lifting assembly 42 and the piston 22 to further compress the gas within the inner cylinder 18 and the storage chamber cylinder 30.

With reference to FIGS. 3-4B, the storage chamber cylinder 30 surrounds the inner cylinder 18. The inner cylinder 18 has an annular inner wall 50 configured to guide the piston 22 and driver blade 26 along the driving axis 38 to compress the gas in the storage chamber cylinder 30. As shown with respect to FIGS. 2-3, the inner frame 48 is coupled to the annular inner wall 50 of the inner cylinder 18. The storage chamber cylinder 30 has an annular outer wall 54 circumferentially surrounding the annular inner wall 50. As such, the inner cylinder 18 is configured to be axially secured to the storage chamber cylinder 30.

With reference to FIGS. 3-4B, the power tool 10 includes a bumper 60 supported by the inner frame 48 and positioned beneath the piston 22 for stopping the piston 22 at the driven position (FIG. 4B) and absorbing the impact energy from the piston 22. The bumper 60 is configured to distribute the impact force of the piston 22 uniformly throughout the bumper 60 as the piston 22 is rapidly decelerated upon reaching the driven position (i.e., the bottom dead center position).

Figure 1C:
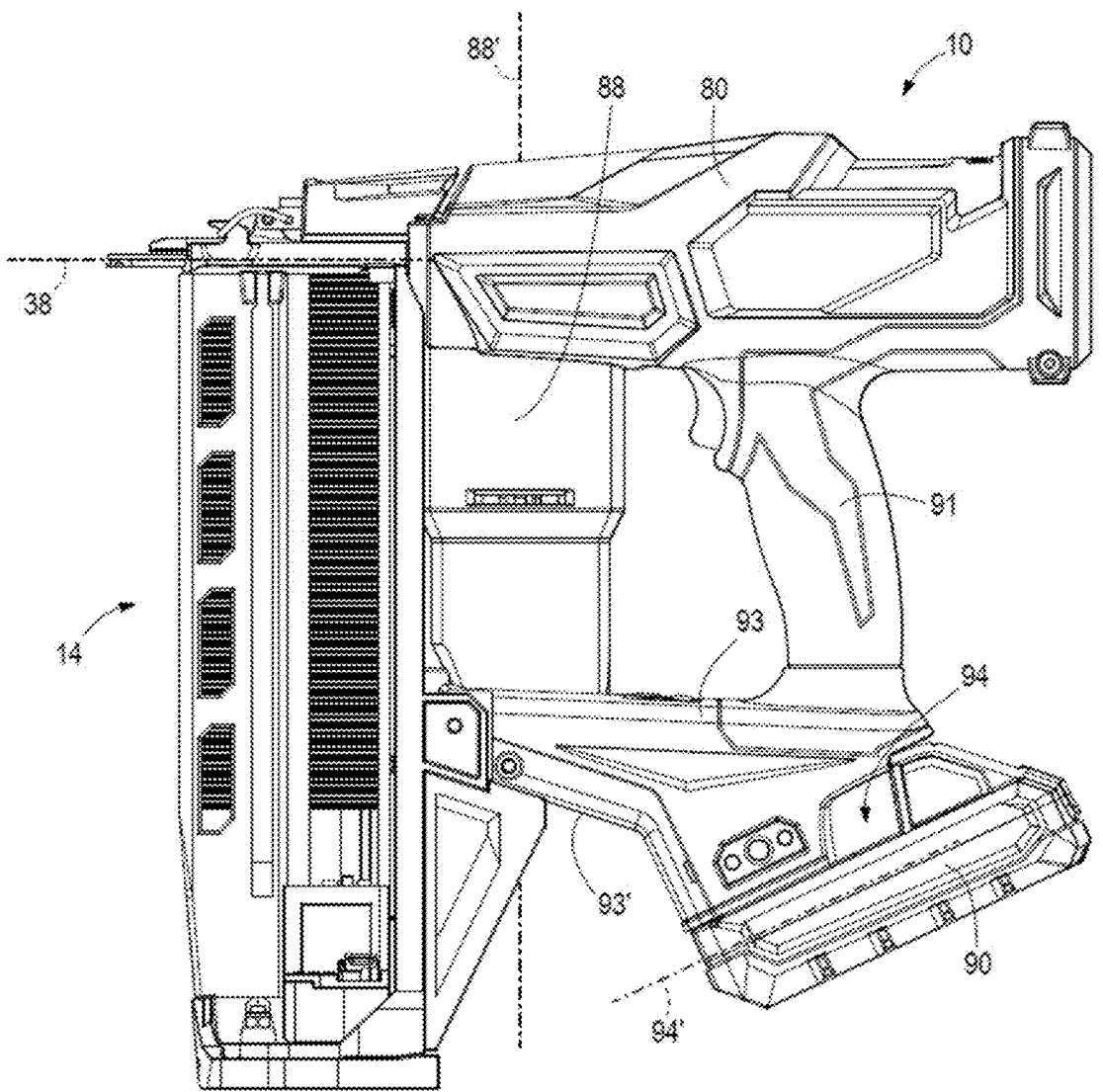
FIG. 1C is a side view of the power tool of FIG. 1A.

With reference to FIG. 1A, the power tool 10 includes a housing 80 having a cylinder support portion 84 in which the storage chamber cylinder 30 is at least partially positioned, a drive unit support portion 88 in which the motor 46 and a transmission 92 (FIG. 2) are at least partially positioned, a handle portion 91, and a battery support portion 93. Additionally, in the illustrated embodiment, the cylinder support portion 84 and the battery support portion 93 are spaced apart from one another and extend between the drive unit support portion 88 and the handle portion 91. Accordingly, the drive unit support portion 88 and the handle portion 91 are spaced apart from one another. As shown in FIG. 1C, the drive unit support portion 88 extends along a drive unit support axis 88' that intersects the driving axis 38. The battery support portion 93 has an angled surface 93' that is positioned at a non-parallel and non-perpendicular angle relative to the drive unit support axis 88'. Moreover, a battery attachment interface 94 defines an insertion axis 94' that is not parallel or perpendicular to driving axis 38 or the drive unit support axis 88'. In the illustrated embodiment, the cylinder support portion 84, the drive unit support portion 88, the handle portion 91, and the battery support portion 93 are integrally formed with one another as a single piece (e.g., using a casting or molding process, depending on the material used). Moreover, the housing 80 is formed from a plastic material. The inner frame 48 is thus made from a harder, stronger, more robust material (e.g., metal) than the material (e.g., plastic) used to form the housing 80.

The transmission 92 raises the driver blade 26 from the driven position to the ready position. With reference to FIG. 1A-3, the motor 46 is positioned within the drive unit support portion 88 for providing torque to the transmission 92 when activated. A battery pack 90 is received and supported by a battery pack attachment interface of the handle portion 91. The battery pack 90 is electrically connectable to the motor 46 for supplying electrical power to the motor 46. In alternative embodiments, the driver may be powered from an alternative power source such as an AC voltage input (i.e., from a wall outlet), or by an alternative DC voltage input (e.g., an AC/DC converter). With reference to FIG. 2, the transmission 92 provides torque to the lifter 44 from the motor 46.

The operation of a firing cycle for the power tool 10 is illustrated and detailed below. With reference to FIGS. 4B, prior to initiation a firing cycle, the driver blade 26 is held in the ready position with the piston 22 near top dead center within the inner cylinder 18. Upon the trigger 49 being pulled to initiate a firing cycle, the motor 46 is activated to rotate the lifter 44 in a counter-clockwise direction from the frame of reference of FIG. 2, thereby displacing the driver blade 26 upward to the TDC position of the driver blade 26. Thereafter, the piston 22 and the driver blade 26 are thrust downward toward the driven position (FIG. 4A) by the expanding gas in the inner cylinder 18 and storage chamber cylinder 30. As the driver blade 26 is displaced toward the driven position, the motor 46 remains activated to continue counter-clockwise rotation of the lifter 44. Upon a fastener being driven into a workpiece, the piston 22 impacts the bumper 60 to quickly decelerate the piston 22 and the driver blade 26, eventually stopping the piston 22 in the driven or bottom dead center position. Shortly after the driver blade 26 reaches the driven position, continued counter-clockwise rotation of the lifter 44 raises the driver blade 26 and the piston 22 toward the ready position.

Although the power tool 10 in FIGS. 1A-4B is illustrated as a straight finish nailer, the power tool 10 could alternatively be any of a variety of different types of fastening power tools. For example, in some embodiments, the power tool 10 is a duplex nailer, a roofing nailer, a framing nailer, a connector nailer, a brad nailer, a pin nailer, a fencing stapler, a crown stapler, a cable stapler, etc. Each fastening power tool is configured to be powered by a power source, such as battery pack 90.

Figure 5:
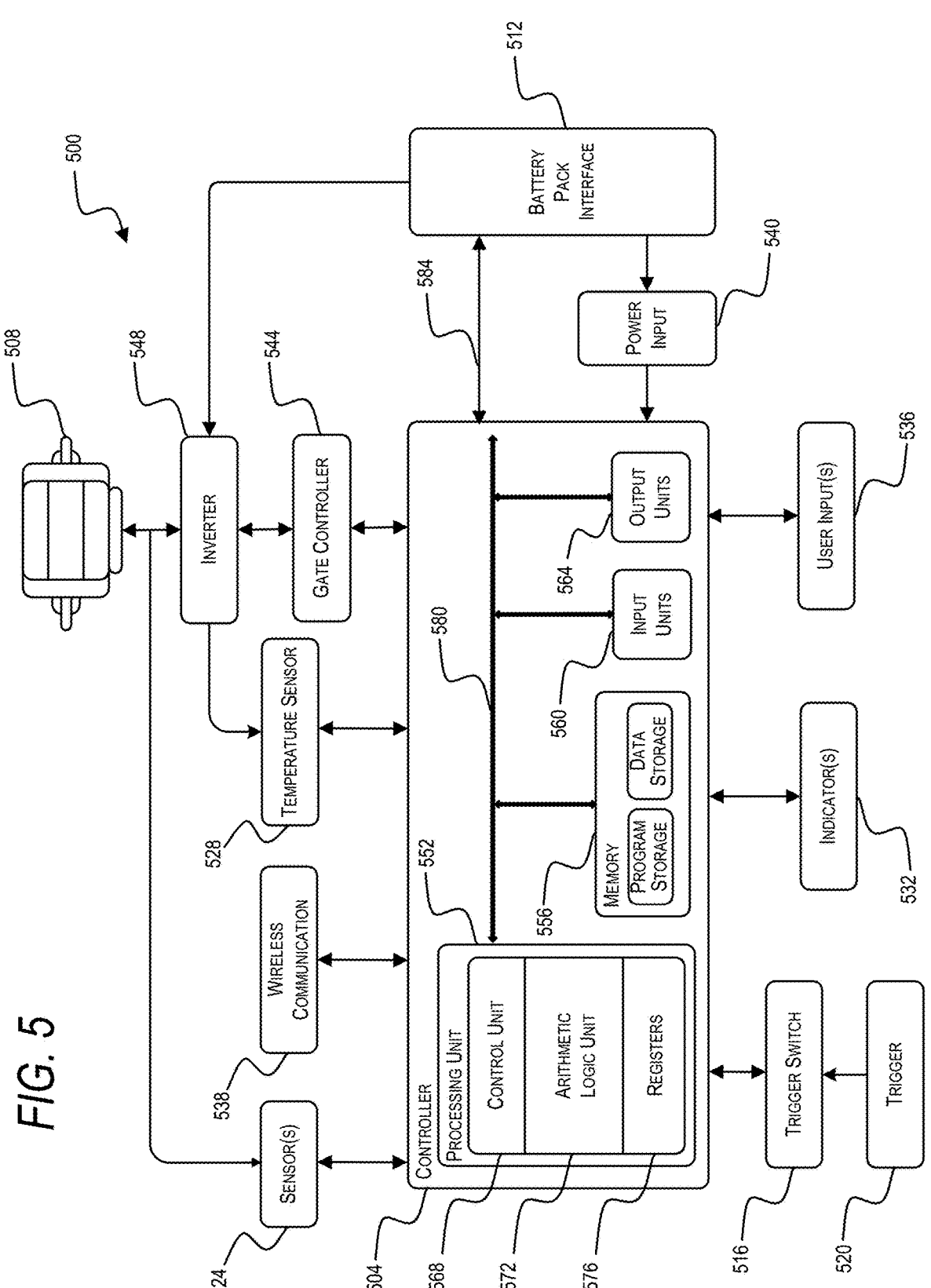
FIG. 5 illustrates a control system for the power tool of FIG. 1A, according to some embodiments.

FIG. 5 illustrates an example control system 500 for the power tool 10. The control system 500 includes a controller 504. The controller 504 may be electrically and/or communicatively connected to a variety of modules or components of the nailer. For example, the illustrated controller 504 is electrically connected to a motor 508 (e.g., motor 46), a battery pack interface 512, a trigger switch 516, one or more sensors 524 (e.g., a current sensor, a position sensor, etc.) and a temperature sensor 528, a wireless communication controller 538, one or more indicators 532, one or more user input modules 536, a power input module 540, and a gate controller 544 (connected to an inverter 548). The motor 508 includes a rotor, a stator, and a shaft that rotates about a longitudinal axis.

The controller 504 includes combinations of hardware and software that are operable to, among other things, control the operation of the power tool 10, monitor the operation of the power tool 10, activate the one or more indicators 532 (e.g., an LED), etc. The gate controller 544 is configured to control the inverter 548 to convert a DC power supply to phase signals for powering the phases of the motor 508. The current sensor 524 is configured to, for example, sense a current between the inverter 548 and the motor 508. The temperature sensor 528 is configured to, for example, sense a temperature of the inverter 548. In some implementations, the temperature sensor 528 is configured to, for example, sense a temperature of the rechargeable battery pack 90.

The controller 504 includes a plurality of electrical and electronic components that provide power, operational control, and protection to the components and modules within the controller 504 and/or the power tool 10. For example, the controller 504 includes, among other things, a processing unit 552 (e.g., a microprocessor, a microcontroller, an electronic processor, an electronic controller, or another suitable programmable device), a memory 556, input units 560, and output units 564. The processing unit 552 includes, among other things, a control unit 568, an arithmetic logic unit ("ALU") 572, and a plurality of registers 576 (shown as a group of registers in FIG. 5), and is implemented using a known computer architecture (e.g., a modified Harvard architecture, a von Neumann architecture, etc.). The processing unit 552, the memory 556, the input units 560, and the output units 564, as well as the various modules or circuits connected to the controller 504 are connected by one or more control and/or data buses (e.g., common bus 580). The control and/or data buses are shown generally in FIG. 5 for illustrative purposes. The use of one or more control and/or data buses for the interconnection between and communication among the various modules, circuits, and components would be known to a person skilled in the art in view of the invention described herein.

The memory 556 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 552 is connected to the memory 556 and executes software instructions that are capable of being stored in a RAM of the memory 556 (e.g., during execution), a ROM of the memory 556 (e.g., on a generally permanent basis), or another non-transitory computer readable medium such as another memory or a disc. Software included in the implementation of the power tool 10 can be stored in the memory 556 of the controller 504. The software includes, for example, firmware, one or more applications, program data, filters, rules, one or more program modules, and other executable instructions. The controller 504 is configured to retrieve from the memory 556 and execute, among other things, instructions related to the control processes and methods described herein. In other constructions, the controller 504 includes additional, fewer, or different components.

The battery pack interface 512 includes a combination of mechanical components (e.g., rails, grooves, latches, etc.) and electrical components (e.g., one or more terminals) configured to and operable for interfacing (e.g., mechanically, electrically, and communicatively connecting) power tool 10 with a battery pack. For example, power provided by the battery pack to the nailer is provided through the battery pack interface 512 to the power input module 540. The power input module 540 includes combinations of active and passive components to regulate or control the power received from the battery pack prior to power being provided to the controller 504. The battery pack interface 512 also supplies power to the inverter 548 to be switched by the switching FETs to selectively provide power to the motor 508. The battery pack interface 512 also includes, for example, a communication line 584 to provide a communication line or link between the controller 504 and the battery pack.

The indicators 532 include, for example, one or more light-emitting diodes ("LEDs"). The indicators 532 can be configured to display conditions of, or information associated with, the power tool 10. For example, the indicators 532 are configured to indicate measured electrical characteristics of the power tool 10, the status of the device, etc. The one or more user input modules 536 may be operably coupled to the controller 504 to, for example, select a forward mode of operation or a reverse mode of operation, a torque and/or speed setting for the power tool 10 (e.g., using torque and/or speed switches), etc. In some embodiments, the one or more user input modules 536 may include a combination of digital and analog input or output devices required to achieve a desired level of operation for the nailer, such as one or more knobs, one or more dials, one or more switches, one or more buttons, etc. In some embodiments, the one or more user input modules 536 may receive signals wirelessly from a device external to the power tool 10 (e.g., a user's mobile phone).

The controller 504 may be configured to determine whether a fault condition of the power tool 10 is present and generate one or more control signals related to the fault condition. For example, the controller 504 may calculate or include, within memory 556, predetermined operational threshold values and limits for operation of the power tool 10. For example, when a potential thermal failure (e.g., of a FET, the motor 508, etc.) is detected or predicted by the controller 504, power to the motor 508 can be limited or interrupted until the potential for thermal failure is reduced. If the controller 504 detects one or more such fault conditions of the nailer or determines that a fault condition of the power tool 10 no longer exists, the controller 504 may be configured to provide information and/or control signals to another component of the power tool 10 (e.g., the battery pack interface 512, the indicators 532, etc.). The signals can be configured to, for example, trip or open a high impedance trace of the nailer, reset a switch, etc.

The controller 504 may be configured to determine a state-of-charge ("SOC") the rechargeable battery pack 90. The controller 504 may also be configured to receive signals from a monitoring circuit (e.g., including sensors 524, etc.) that is configured to sense the SOC level, or voltage value, of battery cells of the rechargeable battery pack 90, and transmit the voltage readings to the controller 504. The voltage level of the battery cells may be determined by, for example, measuring the total open circuit voltage of the battery cells or by summing the voltage measurements of each battery cell. In some embodiments, the monitoring circuit is additionally configured to sense a discharge current of the battery cells (e.g., using a current sensor) and/or a temperature of the rechargeable battery pack 90 (e.g., using a temperature sensor) and transmit the sensed current and/or temperature readings to the controller 504. The monitoring circuit is further configured to receive commands from the controller 504 during operation of the power tool 10. In some embodiments, the SOC, a sensed current, and or a sensed temperature, of the rechargeable battery pack 90 is determined by the battery pack 90 and communicated to the power tool 10.

Figure 6:
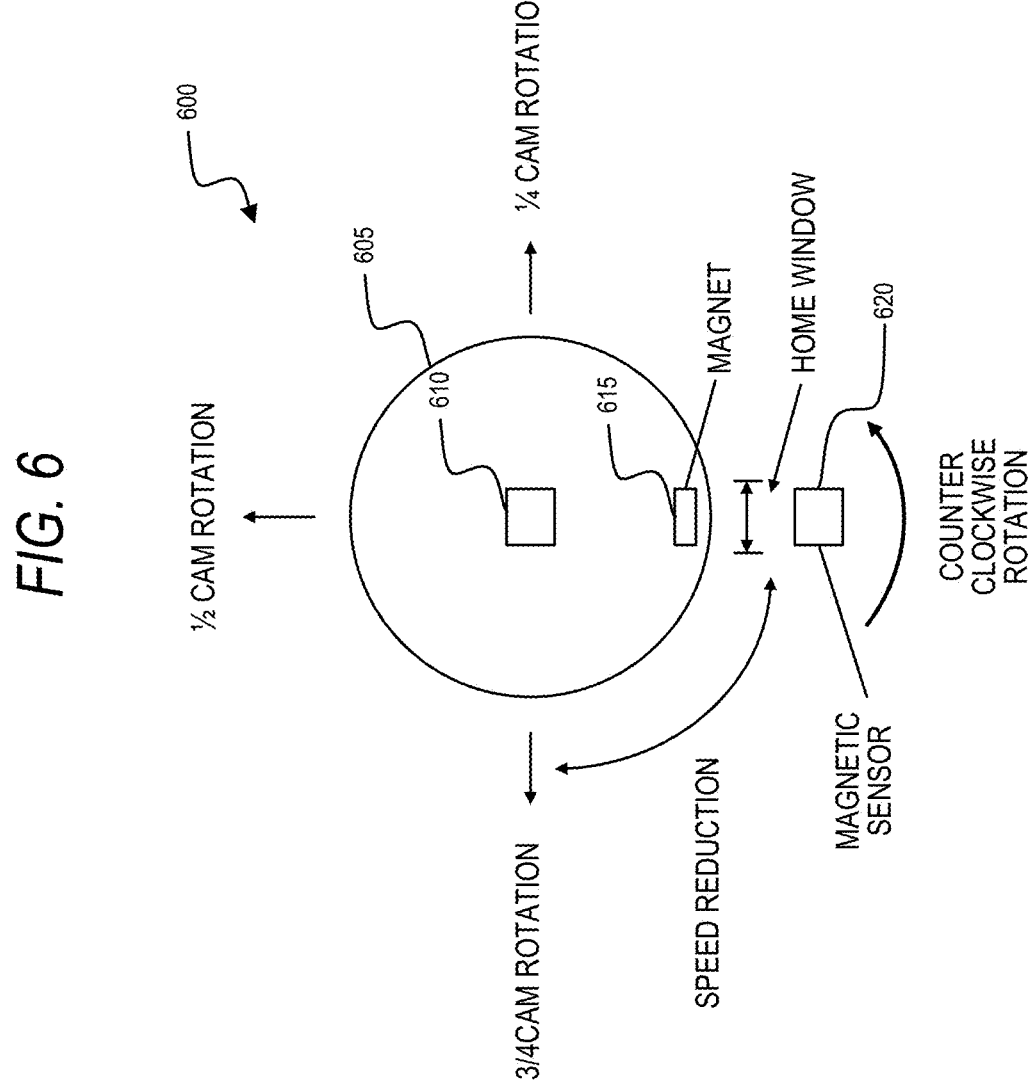
FIG. 6 illustrates rotation of a cam of the power tool of FIG. 1A, according to some embodiments.

FIG. 6 illustrates a cam assembly 600 (e.g., part of the lifting assembly 42). The cam assembly includes a cam 605 that rotates about a rotational axis 610. The cam 605 includes a target 615 (e.g., a magnet) that rotates with the cam 605. A magnetic sensor 620 (e.g., a Hall effect sensor) is configured to detect the target 615 as the cam 605 rotates about the rotational axis 610. In some embodiments, the magnetic sensor 620 is configured to detect when the cam 605 has rotated to a predetermined position (e.g., a three-quarters cam rotation position). The magnetic sensor 620 is configured to output a signal indicative of the position of the cam 605 that is received by the controller 504. In some embodiments, a sensor other than a magnetic sensor can be used to detect the position of the cam 605. For example, an inductive sensor 700 (FIG. 7) can be used to detect the position of the cam 605, as described in greater detail below with respect to FIGS. 7 and 8. Using the inductive sensor 700 can enable absolute position detection and control of the cam 605. Absolute position detection can function it reduce time to fire for the next firing sequence, and reduce the degrees of rotation needed to brake the motor 508.

The motor 508 is configured to operate at a maximum speed or at least without constraint (e.g., a 100% PWM signal) between the start of a reload cycle and the predetermined position of the cam 605. When the controller 504 determines that the cam 605 has rotated to the predetermined position, the controller 504 is configured to control the rotational speed of the motor 508 (e.g., to reduce the PWM signal). For example, between the predetermined position and the end of rotation of the cam 605 (e.g., the home window), the controller 504 is configured to control the speed of the motor 508 using closed loop speed control. Using closed loop speed control, the controller 504 is configured to gradually reduce the speed of the motor (e.g., in a linear manner, an approximately linear manner, etc.) between the predetermined position and the end of rotation of the cam 605.

Figure 7:
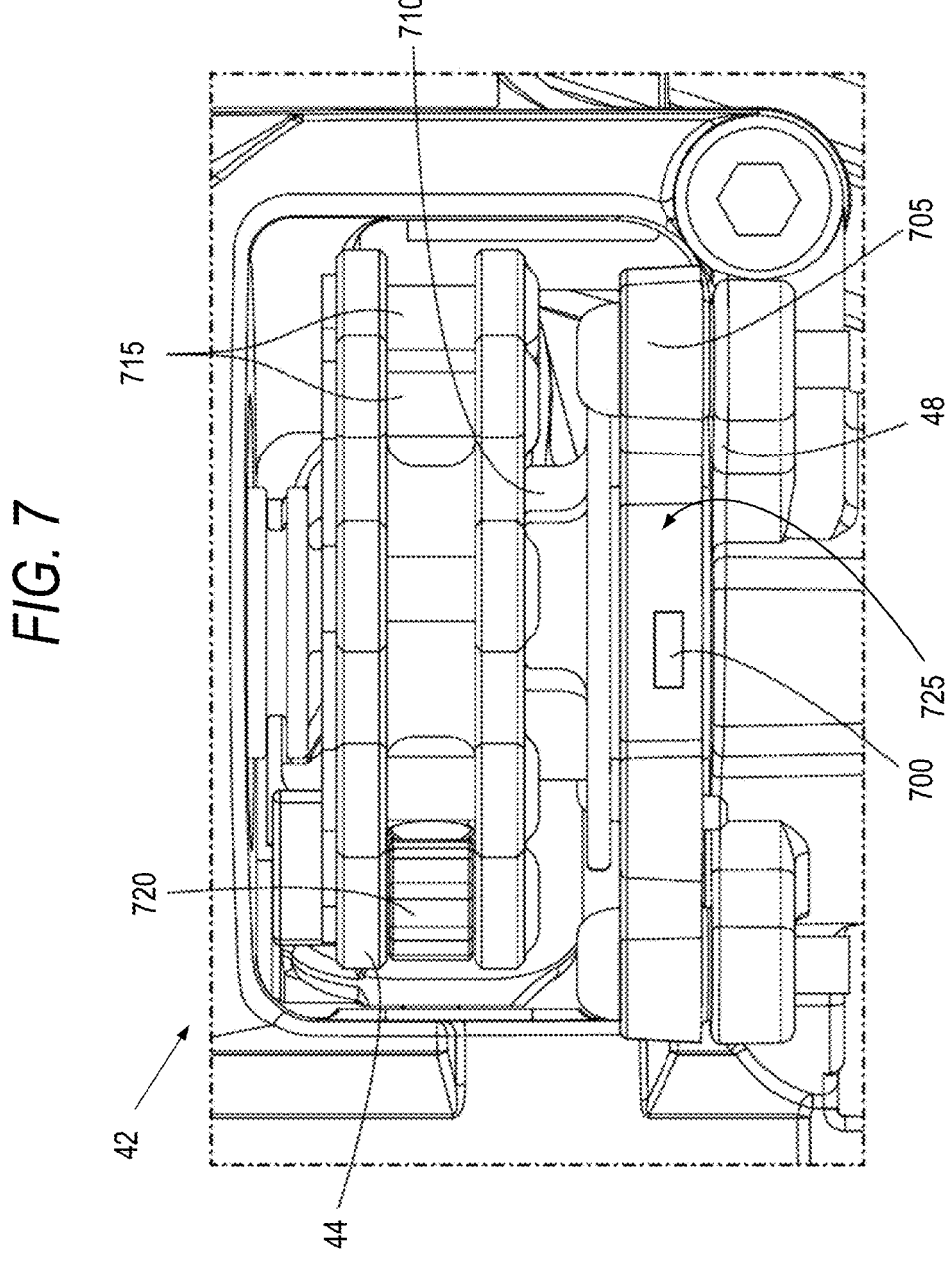
FIG. 7 is a side view of a portion of the power tool of FIG. 1A with portions removed to illustrate a lifting assembly.

FIG. 7 is an enlarged side view of a portion of the power tool of FIG. 1A showing the lifting assembly 42. The power tool 10 includes an inductive sensor 700 coupled to the inner frame 48 by an inductive sensor housing 705, and a sensor target 710 coupled for co-rotation with the lifter 44. The inductive sensor 700 is electrically connected to the controller 504. The sensor target 710 is configured to be sensed or detected by the inductive sensor 700. The inductive sensor 700 may be coupled to any portion of the inductive sensor housing 705 so the sensor target 710 can be detected. The inductive sensor 700 and the sensor target 710 together define a lifter position sensing assembly 725. The lifter position sensing assembly 725 is configured to detect the angular position of the lifter 44 and the controller 504 is configured to stop the motor 508 in response to detecting that the angular position of the lifter 44 has reached the predetermined position. As the lifter 44 rotates, pins 715 and a roller 720 sequentially engage the lift teeth (see FIG. 3) formed on the driver blade 26 to return the driver blade 26 along the driving axis 38 from the BDC position toward the TDC position.

Figure 8:
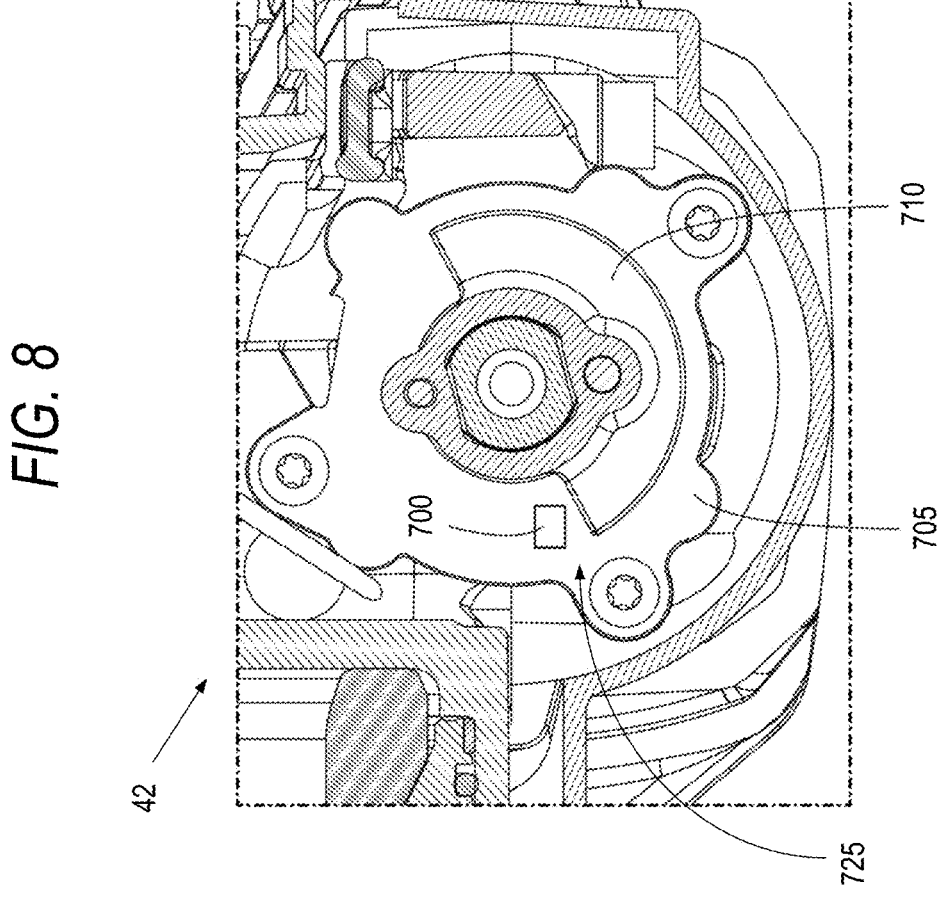
FIG. 8 is a top view of a portion of the power tool of FIG. 1A, illustrating a lifter position sensor assembly coupled to the lifting assembly.

FIG. 8 is a top view of a portion of the power tool of FIG. 1A, illustrating the lifter position sensing assembly 725 coupled to the lifter assembly 42. The inductive sensor 700 is coupled to the frame 48 at a position below the lifter 44 by the inductive sensor housing 705. In other words, the inductive sensor 700 is positioned between the lifter 44 and the motor 508. The sensor target 710 is separate from the lifter 44 and is made from a different material than the lifter 44 (e.g., for weight reduction). In other words, the lifter 44 is formed of a first material and the sensor target 710 is formed of a second material that is different than the first material (e.g., a lighter material). In other embodiments, the sensor target 710 may be integrally formed with the lifter 44 (e.g., a coating on the lifter 44 or the like). Further, in some embodiments, the inductive sensor 700 may be located above the lifter 44 and on an opposite side of the lifter 44 as the motor 508. The combination of the inductive sensor 700 and the sensor target 710, otherwise referred to as the lifter position sensing assembly 725, allows the controller 504 to detect a position of the lifter 44 and may be used to detect abnormalities in the operation of the fastener driver 210.

Figure 9:
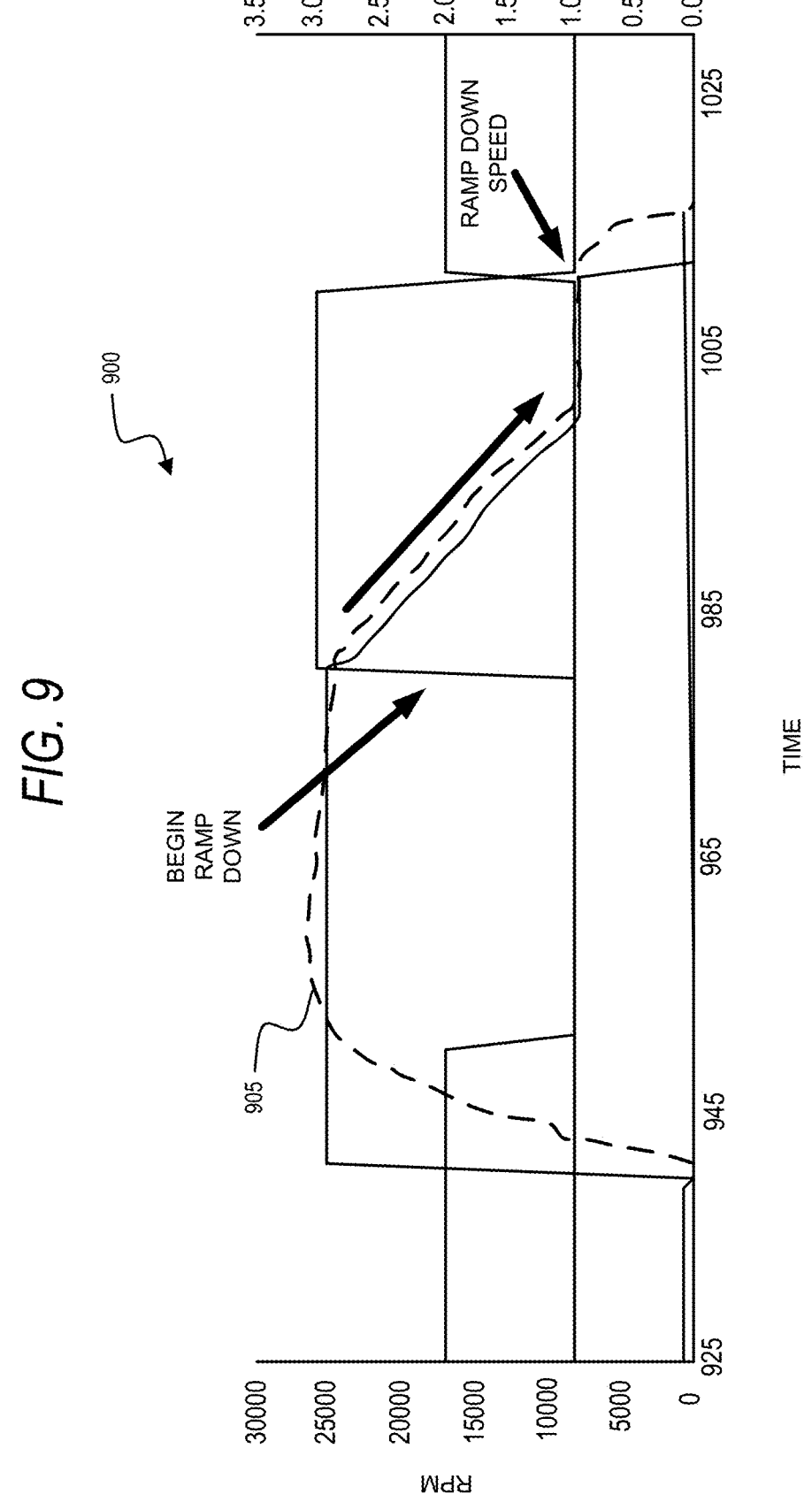
FIG. 9 illustrates closed loop speed control of a motor of the power tool of FIG. 1A, according to some embodiments.

FIG. 9 illustrates the closed loop speed control of the motor 508 with a graph 900 of the speed 905 of the motor 508. The speed ramp down begins at the predetermined position (e.g., the three-quarters cam rotation position), and gradually ramps down the speed of the motor 508. The speed of the motor 508 can be determined by the controller 504 based on, for example, Hall effect sensor transitions that detect the rotational position of a rotor of the motor 508. The speed 905 of the motor 508 eventually reaches a ramp down speed (e.g., 8,000 RPM). After the ramp down speed has been reached, the motor 508 can, for example, be braked by the controller 504.

The closed loop speed control of the motor 508 enables the power tool 10 to limit the amount of energy in the power tool 10 (e.g., during a reload cycle). Such control is particularly advantageous for limiting power when the battery pack 90 has a lower impedance than another existing battery pack. Additionally, by controlling the speed as described above, overshoot of the driver blade 12 can be prevented.

FIG. 10 illustrates a process 1000 for controlling the power tool 10. The process 1000 is implemented such that the controller 504 is configured to determine when to implement the speed ramp down described above with respect to FIGS. 6-9. The process 1000 begins with the power tool 10 operating (e.g., initiating a firing sequence) (STEP 1005). The controller 504 then determines whether a full brake condition is to be implemented (STEP 1010). For example, after a firing sequence when the driver blade 26 is to be driven back to the TDC position, a full brake condition will be present when the motor stops at the TDC position. If no full brake condition is present, the process 1000 returns to STEP 1005. If a full brake condition is to be implemented, the process proceeds to STEP 1015, and a motor parameter is determined. The motor parameter can be a speed of the motor 508 (e.g., rotations per minute of the motor 508). In some embodiments, a motor parameter other than or in addition to speed can be used, such as motor current, motor power, motor torque, motor voltage, etc. In some embodiments, the motor parameter is constantly being monitored such that the controller 504 knows a present value of the motor parameter at all times.

The controller 504 then compares the motor parameter to a threshold value (STEP 1020). For example, when the motor parameter is motor speed, the threshold value is a speed value (e.g., in rotations per minute). If the motor parameter is less than the threshold value, the speed ramp down is not initiated (STEP 1025) and motor 508 is stopped (STEP 1030) without the speed ramp down. If, at STEP 1020, the motor parameter is greater than or equal to the threshold value, the speed ramp down described previously is initiated (STEP 1035). After the speed ramp down, the motor is then stopped (STEP 1030).

Thus, embodiments described herein provide, among other things, a power tool including closed loop speed control. Various features and advantages are set forth in the following claims.

We claim:

1. A power tool comprising:
a housing including a drive unit support portion, a cylinder support portion, and a handle portion;
a motor at least partially positioned within the drive unit support portion;
a storage chamber cylinder at least partially positioned within the cylinder support portion;
an inner cylinder having an annular inner wall defining a driving axis, at least a portion of the annular inner wall located within the storage chamber cylinder;
a driver blade extending along the driving axis;
a cam assembly including a cam that is configured to rotate about a rotational axis to move the driver blade, the cam including a target that rotates with the cam;
a sensor configured to detect the target when the target is at a predetermined rotational position of the cam; and
a controller connected to the motor and the sensor, the controller configured to:
receive a signal from the sensor indicating that the target is at the predetermined rotational position of the cam,
compare a motor parameter to a threshold value, and
initiate a speed ramp down in response to the target being at the predetermined rotational position of the cam and the motor parameter being greater than or equal to the threshold value.

2. The power tool of claim 1, wherein the controller is configured to not initiate the speed ramp down in response to the target being at the predetermined rotational position of the cam and the motor parameter being less than the threshold value.

3. The power tool of claim 1, wherein the target includes a magnet.

4. The power tool of claim 3, wherein the sensor is a Hall effect sensor that is configured to detect a position of the magnet.

5. The power tool of claim 4, wherein the Hall effect sensor is configured to detect the position of the magnet when the magnet is at the predetermined rotational position of the cam.

6. The power tool of claim 5, wherein the speed ramp down is a linear speed ramp down.

7. The power tool of claim 1, wherein the sensor includes an inductive sensor.

8. The power tool of claim 7, wherein the inductive sensor is configured to detect a position of the target when the target is at the predetermined rotational position of the cam.

9. The power tool of claim 8, wherein the speed ramp down is a linear speed ramp down.

10. The power tool of claim 1, wherein the motor parameter is a speed of the motor and the threshold value is a speed threshold value of the motor.

11. A method of operating a power tool, the power tool including a driver blade extending along a driving axis and a cam assembly including a cam that is configured to rotate about a rotational axis to move the driver blade, the cam including a target that rotates with the cam, the method comprising:
receiving, at a controller of the power tool, a signal from a sensor indicating that the target is at a predetermined rotational position of the cam;
comparing a motor parameter to a threshold value; and
initiating a speed ramp down in response to the target being at the predetermined rotational position of the cam and the motor parameter being greater than or equal to the threshold value.

12. The method of claim 11, wherein the target includes a magnet.

13. The method of claim 12, wherein the sensor is a Hall effect sensor, the method further comprising:
detecting, with the Hall effect sensor, a position of the magnet.

14. The method of claim 13, further comprising:
detecting, with the Hall effect sensor, the position of the magnet when the magnet is at the predetermined rotational position of the cam.

15. The method of claim 14, wherein the speed ramp down is a linear speed ramp down.

16. The method of claim 11, wherein the sensor includes an inductive sensor.

17. The method of claim 16, further comprising:
detecting, using the inductive sensor, the target when the target is at the predetermined rotational position of the cam.

18. The method of claim 17, wherein the speed ramp down is a linear speed ramp down.

19. The method of claim 11, wherein the motor parameter is a speed of a motor and the threshold value is a speed threshold value of the motor.

20. A power tool comprising:
a housing;
a motor at least partially positioned within the housing;
a driver blade extending along a driving axis;
a cam assembly including a cam that is configured to rotate about a rotational axis to move the driver blade, the cam including a target that rotates with the cam;
a sensor configured to detect the target when the target is at a predetermined rotational position of the cam; and
a controller connected to the motor and the sensor, the controller configured to:
receive a signal from the sensor indicating that the target is at the predetermined rotational position of the cam,
compare a motor parameter to a threshold value, and
initiate a speed ramp down in response to the target being at the predetermined rotational position of the cam and the motor parameter being greater than or equal to the threshold value.

* * * * *